(12) United States Patent  
Ashizawa

(10) Patent No.: US 8,056,530 B2  
(45) Date of Patent: Nov. 15, 2011

(54) DIRECT INJECTION SPARK IGNITION INTERNAL COMBUSTION ENGINE AND METHOD FOR CONTROLLING SAME

(75) Inventor: Takeshi Ashizawa, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 401 days.

(21) Appl. No.: 12/445,663

(22) PCT Filed: Oct. 23, 2007

(86) PCT No.: PCT/IB2007/003179  
§ 371 (c)(1),  
(2), (4) Date: Apr. 15, 2009

(87) PCT Pub. No.: WO2008/050214  
PCT Pub. Date: May 2, 2008

(65) Prior Publication Data  
US 2010/0288236 A1 Nov. 18, 2010

(30) Foreign Application Priority Data  
Oct. 26, 2006 (JP) ................................. 2006-291044

(51) Int. Cl.  
*F02B 31/00* (2006.01)

(52) U.S. Cl. .................... 123/301; 123/298; 123/305

(58) Field of Classification Search .................. 123/295, 123/298, 301, 305  
See application file for complete search history.

(56) References Cited

U.S. PATENT DOCUMENTS

| 5,259,348 | A | 11/1993 | Kobayashi et al. | |
|---|---|---|---|---|
| 5,775,288 | A | 7/1998 | Suzuki et al. | |
| 2006/0201152 | A1* | 9/2006 | Irisawa | 60/605.1 |
| 2008/0147301 | A1* | 6/2008 | Irisawa | 701/103 |

FOREIGN PATENT DOCUMENTS

| CN | 1488035 A | 4/2004 |
|---|---|---|
| EP | 0 519 275 | 12/1992 |
| EP | 519275 A1 * | 12/1992 |
| JP | 6 81656 | 3/1994 |
| JP | 9 119315 | 5/1997 |
| JP | 9-177572 | 7/1997 |
| JP | 9 287487 | 11/1997 |
| JP | 10 220230 | 8/1998 |
| JP | 2002 227613 | 8/2002 |
| JP | 2003 106177 | 4/2003 |
| JP | 2003 322022 | 11/2003 |
| JP | 2004 52551 | 2/2004 |
| JP | 2005-163686 | 6/2005 |

OTHER PUBLICATIONS

Office Action issued Sep. 26, 2010, in Chinese Patent Application No. 200780038052.6 (with English-language translation).  
Office Action issued Sep. 26, 2010, in Chinese Patent Application No. 200780038052.6 (with English-language translation).

* cited by examiner

*Primary Examiner* — Erick Solis  
(74) *Attorney, Agent, or Firm* — Oblon, Spivak, McClelland, Maier & Neustadt, L.L.P.

(57) ABSTRACT

In a direct injection spark ignition internal combustion engine that performs an Atkinson cycle operation in which the time to close intake valves is retarded, the tumble flow in the engine cylinder is intensified by fuel injected from a fuel injection valve during a time period from an intake stroke bottom dead center to closing of the intake valves.

14 Claims, 4 Drawing Sheets

CRANK ANGLE

DIRECT INJECTION SPARK IGNITION INTERNAL COMBUSTION ENGINE AND METHOD FOR CONTROLLING SAME

BACKGROUND OF THE INVENTION

1. Field of the Invention

The invention relates to a direct injection spark ignition internal combustion engine and a method for controlling a direct injection spark ignition internal combustion engine.

2. Description of the Related Art

During homogenous combustion, if the tumble flow created in each cylinder on an intake stroke can be intensified, the tumble flow remains until the latter half of a compression stroke and then is smashed by the piston, whereby a turbulent flow is created in the cylinder, and this turbulent flow increases the combustion speed. In direct injection spark ignition internal combustion engines, the thrust force of the fuel injected into each cylinder can be utilized to intensify the tumble flow.

Meanwhile, a direct injection spark ignition internal combustion engine is proposed which performs the Atkinson cycle (Miller cycle) operation in which the time to close the intake valves is retarded so as to reduce the pumping loss and thus the fuel consumption (For example, refer to Japanese Patent Application Publication No. 2004-52551 (JP-A-2004-52551).

In typical Atkinson cycle direct injection spark ignition internal combustion engines including the one described above, the fuel injection time is set to a point before the intake stroke bottom dead center. In such engines, although fuel is injected before the intake stroke bottom dead center, the tumble flow in each cylinder can be intensified by setting the fuel injection direction appropriately, and the intensified tumble flow remains until the latter half of the compression stroke. However, if the turbulent flow in the cylinder is intensified by further intensifying the tumble flow in the latter half of the compression stroke, the combustion speed of homogenous combustion increases and thus the combustion state improves accordingly.

SUMMARY OF THE INVENTION

The invention provides a technology that enables to intensify, in a direct injection spark ignition internal combustion engine, the tumble flow created in each engine cylinder on an intake stroke to an extent that the intensified tumble flow remains until the latter half of the compression stroke and thus creates a turbulent flow in the engine cylinder.

The first aspect of the invention relates to a direct injection spark ignition internal combustion engine that has a fuel injection valve that directly injects fuel into an engine cylinder and performs an Atkinson cycle operation in which the time to close an intake valve is retarded. The tumble flow in the engine cylinder is intensified by the fuel injected from the fuel injection valve during a time period from the intake stroke bottom dead center to the closing of the intake valve.

In a direct injection spark ignition internal combustion engine that performs the Atkinson cycle operation in which the time to close each intake valve is retarded, during the time period from the intake stroke bottom dead center to the closing of the intake valves, the intake air in the engine cylinder flows out via the intake valve and this outflow of intake air accelerates the tumble flow that is created in the engine cylinder before the intake stroke bottom dead center so as to flow downward in the exhaust valve side in the cylinder and upward in the intake valve side in the cylinder. According to the direct injection spark ignition internal combustion engine of the first aspect of the invention, the tumble flow is intensified using the fuel injected from the fuel injection valve as well as using the aforementioned outflow of intake air, and therefore the tumble flow can be effectively intensified. The tumble flow that has been intensified in the former half of the compression stroke as described above does not decline so much and thus remains strong in the latter half of the compression stroke. Then, the tumble flow is smashed by the piston, whereby a strong turbulent flow is produced in the cylinder.

The direct injection spark ignition internal combustion engine of the first aspect of the invention may be such that, during the time period from the intake stroke bottom dead center to the closing of the intake valve, when the engine speed is high, the time to inject fuel from the fuel injection valve is advanced as compared to when the engine speed is low.

When the engine speed is high, the time period from the end of the fuel injection to the time of ignition tends to be short as compared to when the engine speed is low. According to the above-described structure, therefore, in order to secure a sufficient time for the vaporization of the injected fuel, during the time period from the intake stroke bottom dead center to the closing of the intake valve, when the engine speed is high, the time to inject fuel from the fuel injection valve is advanced as compared to when the engine speed is low.

Each of the above-described direct injection spark ignition internal combustion engines may be such that, during the time period from the intake stroke bottom dead center to the closing of the intake valve, when the engine speed is high, an injection rate at which fuel is injected from the fuel injection valve is increased as compared to when the engine speed is low.

When the engine speed is high, the time period from the end of the fuel injection to ignition tends to be short as compared to when the engine speed is low. According to the above-described structure, therefore, in order to secure a sufficient time for fuel vaporization before ignition, during the time period from the intake stroke bottom dead center to the closing of the intake valve, when the engine speed is high, the injection rate is increased as compared to when the engine speed is low.

The direct injection spark ignition internal combustion engine of the first aspect of the invention may be such that the fuel injection valve is provided at the intake valve side of the periphery of the upper area of the engine cylinder and injects fuel toward an upper portion of an exhaust valve side of a bore of the engine cylinder.

According to this structure, because the fuel injection valve is provided at the intake valve side of the periphery of the upper area of the engine cylinder and injects fuel toward the upper portion of the exhaust valve side of the bore of the engine cylinder, the tumble flow can be effectively intensified by the injected fuel.

The above-described direct injection spark ignition internal combustion engine may be such that the profile of a cam for the intake valve is formed such that the speed at which the intake valve is opened is higher than the speed at which the intake valve is closed.

The fuel injected from the fuel injection valve provided at the periphery of the upper area of the engine cylinder toward the upper portion of the exhaust valve side of the bore of the engine cylinder is likely to hit the intake valve near its maximum lift position. According to the above-described structure, therefore, the profile of the cam for the intake valve is formed such that the speed at which the intake valve is opened is higher than the speed at which the intake valve is closed. Thus, the lift of the intake valve is small during the time period from the intake stroke bottom dead center to the closing of the intake valve; whereby the injected fuel is prevented from hitting the intake valve.

BRIEF DESCRIPTION OF THE DRAWINGS

The above and other features of the present invention will become apparent from the following description of embodiments given in conjunction with the accompanying drawings, in which.

DETAILED DESCRIPTION OF EMBODIMENTS

Figure 1:
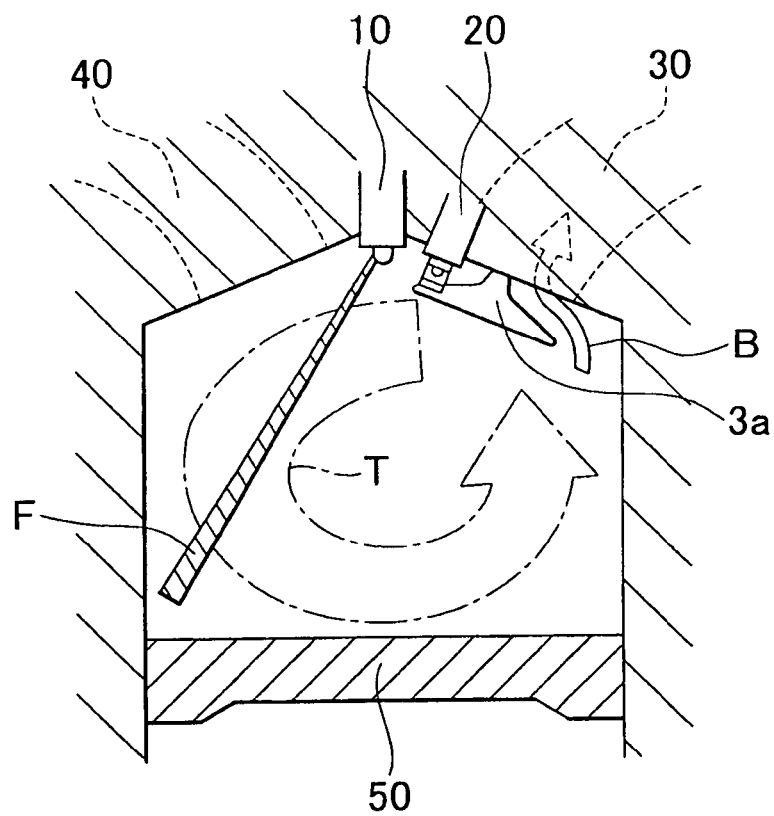
FIG. 1 is a vertical cross-sectional view schematically showing the structure of each cylinder of a direct injection spark ignition internal combustion engine according to an exemplary embodiment of the invention.

FIG. 1 is a vertical cross-sectional view schematically showing the structure of each cylinder of a direct injection spark ignition internal combustion engine according to an exemplary embodiment of the invention. Specifically, FIG. 1 shows a state at the time of fuel injection for homogenous combustion. FIG. 1 shows a fuel injection valve 10 that is provided at substantially the center of the upper area of the cylinder to inject fuel directly into the cylinder, an ignition plug 20 that is provided near the fuel injection valve 10, a pair of intake ports 30 communicating with the inside of the cylinder via a pair of intake valves 3a, a pair of exhaust ports 40 communicating with the inside of the cylinder via a pair of exhaust valves (not shown in the drawings), and a piston 50.

In the direct injection spark ignition internal combustion engine of this exemplary embodiment, fuel is directly injected into each cylinder such that a homogenous air-fuel mixture is formed at the ignition time that comes at the end of the compression stroke. This homogenous air-fuel mixture is ignited by a spark, whereby homogenous combustion is performed.

The fuel injection valve 10, as shown in FIG. 1, injects fuel F obliquely downward toward the exhaust valve side of the cylinder bore (preferably to the lower portion of the exhaust valve side of the cylinder bore). The thrust force of the fuel F injected from the fuel injection valve 10 is set such that the front of the injected fuel F reaches the point at least 60 mm away from the injection hole 1 msec after the beginning of the fuel injection.

As the injected fuel F having such a large thrust force moves obliquely downward from substantially the center of the upper area of the cylinder toward the exhaust valve side of the cylinder bore, the thrust force of the injected fuel F intensifies a tumble flow T that has been created in the cylinder and is flowing downward in the exhaust valve side of the cylinder and upward in the intake valve side. The tumble flow T thus intensified reliably remains until the latter half of the compression stroke and then is smashed by the piston 50, whereby a turbulent flow is created in the cylinder. Therefore, if the air-fuel mixture is ignited at the end of the compression stroke, homogenous combustion progresses at a high speed and thus in a good condition.

The shape into which fuel F is injected may be arbitrarily selected from among various shapes. For example, using a single injection hole, the fuel F can be injected into, for example, the shape of a solid or hollow cone. Further, using a slit-shaped injection hole, the fuel F can be injected into a relatively thin fan-like shape. Further, using an arc-slit-shaped injection hole, the fuel F can be injected into a relatively thin arc shape, the convex side of which faces the upper side and the exhaust valve side. Further, using a combination of two or more straight-slit-shaped injection holes, the fuel F can be injected into an angular shape. In short, the fuel F may be injected into any shape as long as the thrust force of the injected fuel F can be made large enough to accelerate the tumble flow T in the cylinder.

In the direct injection spark ignition internal combustion engine of this exemplary embodiment, because the ignition plug 20 is provided on the intake valve side of the fuel injection valve 10, the ignition plug 20 is not moistened by the fuel that has been injected from the fuel injection valve 10 toward the exhaust valve side of the cylinder bore, and therefore the ignition plug 20 can appropriately generate electric arcs at ignition.

In the direct injection spark ignition internal combustion engine of this exemplary embodiment, in order to save the fuel consumption, the air-fuel ratio for homogenous combustion is set to a ratio that is leaner than the stoichiometric air-fuel ratio (preferably 0.20 or more, which suppresses the production of NOx), and therefore homogenous combustion tends to progress slowly. Thus, it is especially advantageous to increase the combustion speed as mentioned above. Meanwhile, the air-fuel ratio for homogenous combustion may alternatively be set to the stoichiometric air-fuel ratio or to a rich air-fuel ratio. In this case, too, increasing the combustion speed provides various advantages.

The direct injection spark ignition internal combustion engine of this exemplary embodiment performs the Atkinson cycle (Miller cycle) operation in which the time to close the intake valves 3a is set in the range of 90±20°CA (Crank Angle) after the intake stroke bottom dead center in order to reduce the pumping loss and thus the fuel consumption. In the case where the time to close the intake valves 3a is thus retarded, a portion of the intake air in the cylinder flows out to the intake ports 30 though the intake valves 3a during the time period from the intake stroke bottom dead center to the closing of the intake valves 3a as shown in FIG. 1. More precisely, because intake air continues to enter the cylinder from the intake ports 30 for a while after the intake stroke bottom dead center, the aforementioned outflow of intake air to the intake ports 30 starts immediately after the inflow of intake air from the intake ports 30 ends.

Figure 2:
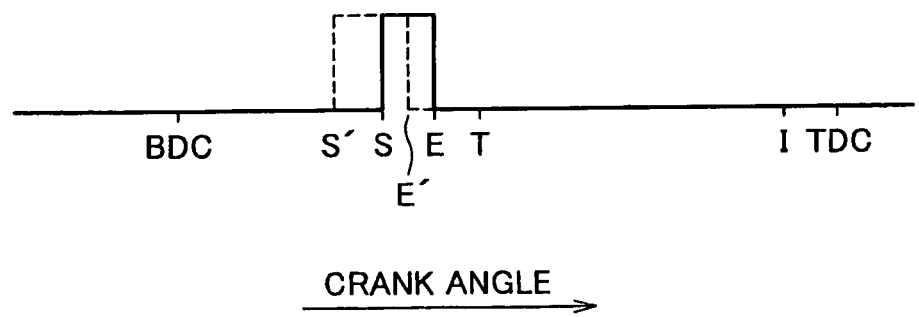
FIG. 2 is a timechart indicating the lift of the valve element of the fuel injection valve.

This outflow of intake air through the intake valves 3a accelerates the tumble flow T flowing upward along the intake valve side of the cylinder bore. FIG. 2 is a timechart indicating the lift of the valve element of the fuel injection valve 10. In this exemplary embodiment, as indicated by the solid lines in FIG. 2, the fuel injection valve 10 starts fuel injection at the injection start time S and ends the fuel injection at the injection end time E during the time period from the intake bottom dead center BDC to the intake-valve-closing time T, so that the tumble flow T, which has been accelerated by the aforementioned outflow of intake air, is further intensified by the injected fuel F. In this case, therefore, the tumble flow can be effectively intensified as compared to a case where a non-accelerated tumble flow is intensified by the injected fuel before the intake stroke bottom dead center BDC.

The tumble flow T, which has been effectively intensified in the former half of the compression stroke as described above, hardly declines and thus remains strong in the latter half of the compression stroke after the intake valves 3a are closed. Then, the tumble flow T is smashed by the piston 50, whereby a turbulent flow is created in the cylinder. Thus, if ignition is performed at the ignition time I immediately before the compression stroke top dead center TDC, the turbulent flow makes homogenous combustion progress at a high speed and thus in a good condition. Meanwhile, in the case where fuel injection is performed before the intake stroke bottom dead center BDC, because fuel injection is finished before the aforementioned outflow of intake air occurs, the injected fuel may be brought out of the cylinder by the outflow of intake air. In the exemplary embodiment, on the other hand, because the outflow of intake air occurs when fuel is still being injected toward the exhaust value side in the cylinder, the injected fuel is unlikely to be brought out of the cylinder by the outflow of intake air.

In the case where fuel is injected on the compression stroke as in this exemplary embodiment, the time period from the injection end time E to the ignition time I becomes relatively short, and therefore the time allowed for the vaporization of the injected fuel is not so long. Therefore, when the engine speed becomes high and the time period from the injection end time E to the ignition time I therefore decreases, the time allowed for the vaporization of fuel may become insufficient.

To cope with this issue, during the time period from the intake stroke bottom dead center BDC to the intake-valve-closing time T, if the engine speed is high, the injection start time is advanced to S' and the injection end time is advanced to E' as indicated by the dotted lines in FIG. 2, whereby the fuel vaporization time from the end of fuel injection to the ignition time I is made sufficient even though the crank angle range corresponding to the fuel injection duration widens as a result of advancing the injection start time and the injection end time assuming that the fuel injection amount is unchanged. Needless to say, the injection start time corresponding to a given fuel injection amount is preferably advanced as the engine speed increases. However, advancing the injection start time to before the intake stroke bottom dead center BDC is undesirable. Further, the injection start time is advanced as the fuel injection amount increases.

Figure 3:
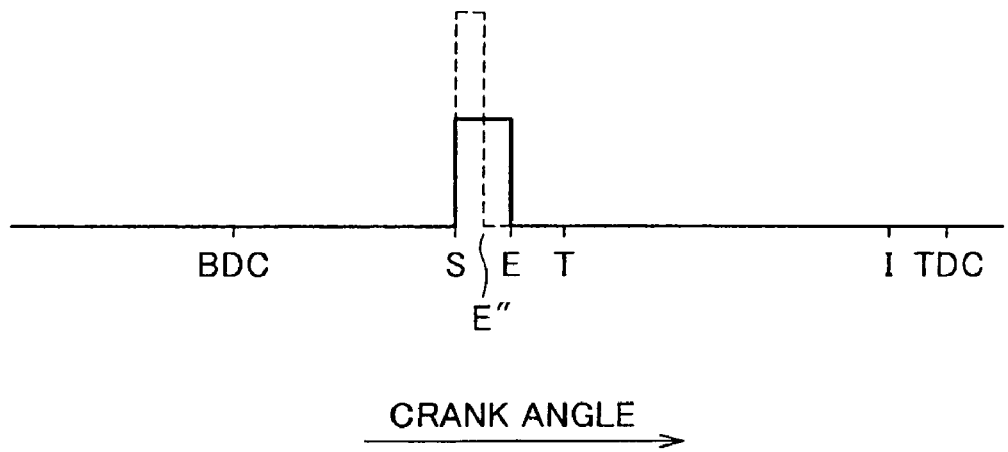
FIG. 3 is another timechart indicating the lift of the valve element of the fuel injection valve.

Further, in the case where the fuel injection valve 10 is a fuel injection valve that can change its injection rate in two levels, the fuel vaporization time from the end of fuel injection to the ignition time I can be made sufficient as follows. That is, as indicated by the dotted lines in FIG. 3 that is a timechart illustrating the lift of the valve element of the fuel injection valve 10, during the time period from the intake stroke bottom dead center BDC to the intake-valve-closing time T, if the engine speed is high, the injection rate is increased, so that the crank angle range corresponding to the fuel injection duration narrows and thus the injection end time is advanced to E". To achieve such narrowing of the crank angle range corresponding to the fuel injection duration despite that the engine speed is high, the injection rate of the fuel injection valve 10 needs to be increased considerably. Therefore, at this time, the aforementioned advancing of the injection start time may also be performed.

Figure 4:
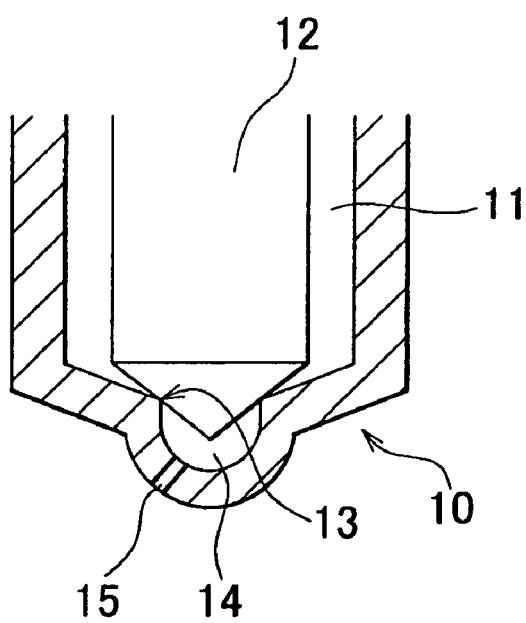
FIG. 4 is a cross-sectional view showing the lower end portion of the fuel injection valve.

The injection rate of the fuel injection valve 10, that is, the rate at which fuel is injected from the fuel injection valve 10 can be adjusted in two levels by, for example, controlling the lift of the valve element of the fuel injection valve 10 in two levels. FIG. 4 is a cross-sectional view showing the lower end portion of the fuel injection valve 10. Referring to FIG. 4, a fuel passage 11 is provided in the fuel injection valve 10, which extends in the axial direction of the fuel injection valve 10, and a valve element 12 is provided in the fuel passage 11, which is movable in the axial direction of the fuel injection valve 10. A fuel sump 14 is formed downstream of a seat portion 13 that contacts the seal portion of the valve element 12. An injection hole 15 is formed such that the fuel sump 14 communicates with the outside through the injection hole 15.

In the fuel injection valve 10 configured as described above, when the valve element 12 has been lifted up and thus the seal portion of the valve element 12 has moved apart from the seat portion 13, the high pressure fuel in the fuel passage 11 is supplied into the fuel sump 14, and when the pressure of the fuel in the fuel sump 14 has exceeded the pressure in the cylinder, the fuel is injected from the fuel sump 14 through the injection hole 15. On the other hand, when the seal portion of the valve element 12 comes into contact with the seat portion 13, the supply of high-pressure fuel from the fuel passage 11 to the fuel sump 14 is interrupted, whereby the pressure of the fuel in the fuel sump 14 decreases, and when the pressure of the fuel in the fuel sump 14 has become lower than the pressure in the cylinder, the fuel injection from the injection hole 15 stops.

Figure 5A:
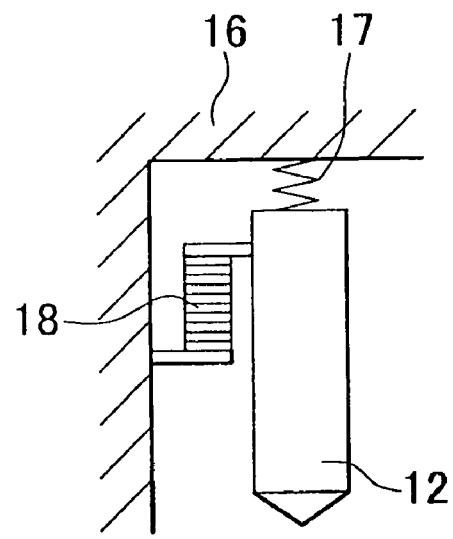
FIG. 5A and FIG. 5B are views schematically showing structures for variably controlling the lift of the valve element of the fuel injection valve.
Figure 5B:
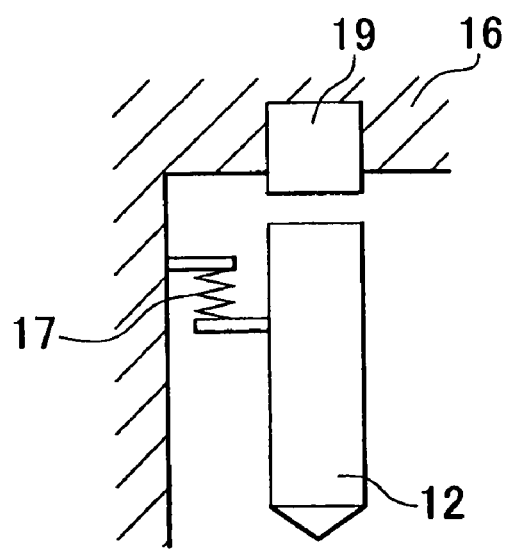

The fuel injection valve 10 is structured such that its lift can be adjusted in at least two levels, as schematically illustrated in FIG. 5A and FIG. 5B, respectively. In the structure illustrated in FIG. 5A, the valve element 12 is urged in the valve closing direction by a valve-close spring 17 that is provided between the valve element 12 and a valve main body 16. A piezoelectric strain actuator (piezo actuator) 18 is also provided between the valve element 12 and the valve main body 16. As the piezoelectric strain actuator 18 extends, the valve element 12 moves upward, whereby the fuel injection valve 10 opens. Thus, the lift of the valve element 12 can be adjusted in two levels, that is, between a large lift and a small lift, by adjusting the extension of the piezoelectric strain actuator 18 in two levels by controlling the voltage supplied to the piezoelectric strain actuator 18 in two levels.

On the other hand, in the structure shown in FIG. 5B, the valve element 12 is urged in the valve closing direction by a valve-close spring 17 that is provided between the valve element 12 and the valve main body 16, and an electromagnetic actuator (solenoid actuator) 19 is provided in the valve main body 16. The electromagnetic actuator 19 is arranged to face the base portion of the valve element 12 so that the electromagnetic attracting force of the electromagnetic actuator 19 acts in the direction to lift the valve element 12 up, that is, in the direction to open the fuel injection valve 10. As such, the lift of the valve element 12 can be adjusted in two levels, that is, between a large lift and a small lift, by adjusting the electromagnetic attracting force acting on the valve element 12 in two levels by controlling the voltage supplied to the electromagnetic actuator 19 in two levels.

The control apparatus of this exemplary embodiment controls the lift of the valve element 12 of the fuel injection valve 10 configured as described above such that the valve element 12 is lifted up by a large lift when the engine speed is higher than a reference engine speed and the valve element 12 is lifted up by a small lift when the engine speed is lower than the reference engine speed. The smaller the lift of the valve element 12, the narrower the clearance between the valve element 12 and the seat portion 13 becomes when the valve element 12 is lifted up, and therefore the pressure loss at the clearance increases and thus the pressure of the fuel injected from the fuel sump 14 decreases. As such, if the valve element 12 is lifted up by the small lift, the injection rate of the fuel injected from the injection hole 15 is low, and if the valve element 12 is lifted up by the large lift, the injection rate of the fuel injected from the injection hole 15 is high.

In the above-described structure of the fuel injection valve 10, the lift of the valve element 12 can be adjusted in multiple levels by controlling the voltage supplied to the piezoelectric strain actuator 18 or to the electromagnetic actuator 19 in multiple levels. Thus, the injection rate of the fuel injection valve 10 may be controlled such that it increases as the engine speed increases. Preferably, the injection rate of the fuel injection valve 10 is controlled so as to ensure that, even when the injection rate is at the minimum level for the low engine speed state, the tumble flow T is intensified to an extent that the front of the injected fuel reaches the point at least 60 mm away from the injection hole 1 msec after the beginning of the fuel injection. Note that if the injection rate is always high regardless of the engine speed, it is impossible to inject a small amount of fuel accurately, for example, when the engine is running at a low speed and under a small engine load.

Figure 6:
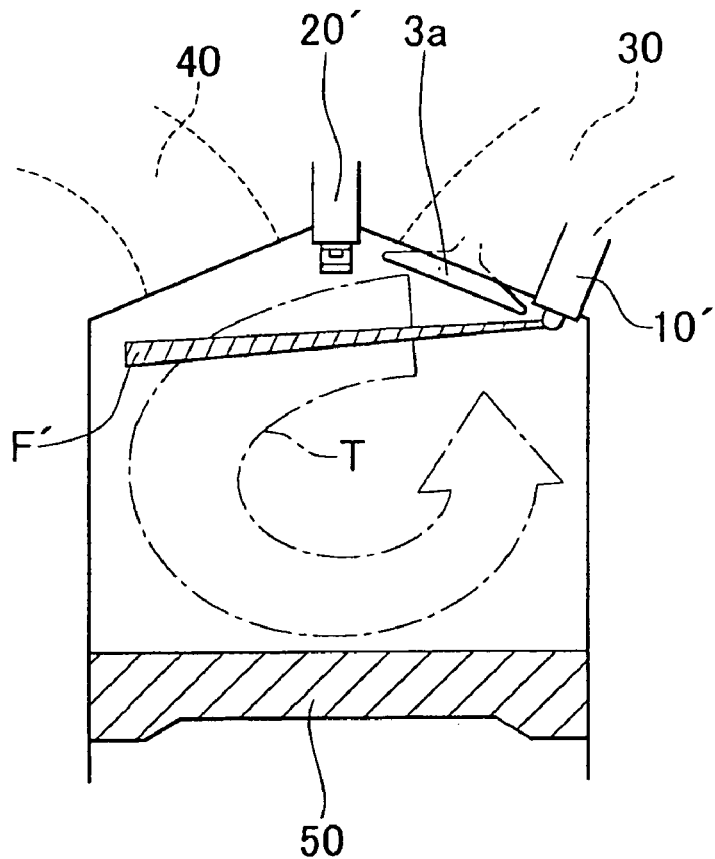
FIG. 6 is a vertical cross-sectional view schematically showing the structure of each cylinder of a direct injection spark ignition internal combustion engine according to another exemplary embodiment of the invention.

FIG. 6 shows a vertical cross-sectional view schematically showing the structure of each cylinder of a direct injection spark ignition internal combustion engine according to another exemplary embodiment of the invention. Hereinafter, only the differences from the exemplary embodiment of FIG. 1 will be described. In this exemplary embodiment, a fuel injection valve 10' is provided at the intake valve 3a side of the periphery of the upper area of the cylinder. In this exemplary embodiment, too, the intake valves 3a are two in each cylinder, and therefore the fuel injection valve 10' is preferably provided between the two intake valves 3a at the periphery of the upper area of the cylinder. An ignition plug 20' is provided at substantially the center of the upper area of the cylinder.

Thus arranged, the fuel injection valve 10' injects fuel F' substantially horizontally toward the upper portion of the exhaust valve side of the cylinder bore as shown in FIG. 6. The thrust force of the fuel F' injected from the fuel injection valve 10' is set such that the front of the injected fuel F' reaches the point at least 60 mm away from the injection hole 1 msec after the beginning of the fuel injection, as in the former exemplary embodiment. As the injected fuel F' having such a large thrust force moves substantially horizontally toward the upper portion of the exhaust valve side of the cylinder bore from the intake valve 3a side of the periphery of the upper area of the cylinder, the thrust force of the injected fuel F' intensifies the tumble flow T.

In this exemplary embodiment, as in the former exemplary embodiment, fuel injection is performed at the time the tumble flow T is intensified by the aforementioned outflow of intake air through the intake valves 3a during the time period from the intake stroke bottom dead center BDC to the closing of the intake valves 3a. In the structure employed in this exemplary embodiment, however, if the fuel F' is simply injected from the fuel injection valve 10', the injected fuel F' is likely to hit the opened intake valves 3a. If the injected fuel F' hits the intake valves 3a, the tumble flow T can not be effectively intensified.

Figure 7:
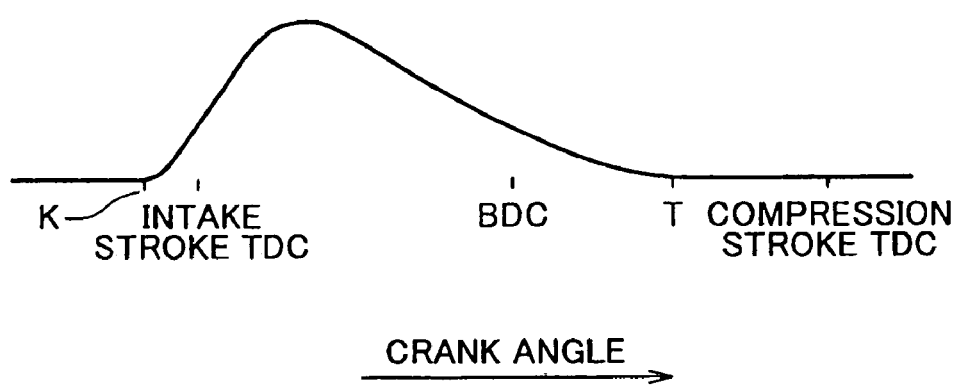
FIG. 7 is a timechart indicating the lift of the intake valve.

To counter this, in this exemplary embodiment, the profile of each intake valve cam is formed so as to obtain the intake valve lift pattern shown in FIG. 7. During the Atkinson cycle operation, the intake valves 3a start to be opened at the valve-open time K before the intake stroke top dead center TDC and closed at the valve-closing time T that is, for example, 90°CA (Crank Angle) after the intake stroke bottom dead center BDC. In this exemplary embodiment, the speed at which the intake valves 3a are opened is set higher than the speed at which the intake valves 3a are closed such that, when the intake valves 3a are opened as mentioned above, the maximum lift of each intake valve 3a is reached in or before the middle stage of the intake stroke. That is, the time taken for lifting each intake valve 3a down to the valve close position from the maximum lift position is set longer than the time taken for lifting each intake valve 3a up to the maximum valve position from the valve close position.

As such, the lift of each intake valve 3a is made small during the time period from the intake stroke bottom dead center BDC to the closing of the intake valves 3a, and therefore the fuel F' injected during this time period effectively intensifies the tumble flow T without hitting the opened intake valves 3a.

The invention claimed is:

1. A direct injection spark ignition internal combustion engine that performs an Atkinson cycle operation in which the time to close an intake valve is retarded, comprising:
   a fuel injection valve that directly injects fuel into an engine cylinder, wherein:
   a tumble flow in the engine cylinder is intensified by fuel injected from fuel injection valve during a time period from an intake stroke bottom dead center to closing of the intake valve; and
   the fuel injection is controlled to be started after the intake stroke bottom dead center has been passed; and
   the engine performs the operation that the timing of closing the intake valve is retarded within an Atkinson cycle operation range.

2. The direct injection spark ignition internal combustion engine according to claim 1, wherein the fuel injection during the operation in which the intake valve is controlled to be closed after the intake stroke bottom dead center is controlled to be started, regardless of an engine speed, after the intake stroke bottom dead center has been passed.

3. The direct injection spark ignition internal combustion engine according to claims 1, wherein during the time period from the intake stroke bottom dead center to the closing of the intake valve, when the engine speed is high, the time to inject fuel from the fuel injection valve is advanced as compared to when the engine speed is low.

4. The direct injection spark ignition internal combustion engine according to claim 3, wherein during the time period from the intake stroke bottom dead center to the closing of the intake valve, when the engine speed is high, the time to start fuel injection from the fuel injection valve and the time to end the fuel injection are both advanced as compared to when the engine speed is low.

5. The direct injection spark ignition internal combustion engine according to claim 1, wherein during the time period from the intake stroke bottom dead center to the closing of the intake valve, when the engine speed is high, an injection rate at which fuel is injected from the fuel injection valve is increased as compared to when the engine speed is low.

6. The direct injection spark ignition internal combustion engine according to claim 5, wherein during the time period from the intake stroke bottom dead center to the closing of the intake valve, when the engine speed is high, the time to end fuel injection from the fuel injection valve is advanced by increasing the injection rate as compared to when the engine speed is low.

7. The direct injection spark ignition internal combustion engine according to claim 5, wherein the injection rate is controlled by controlling lift of a valve element of the fuel injection valve.

8. The direct injection spark ignition internal combustion engine according to claim 7, wherein during the time period from the intake stroke bottom dead center to the closing of the intake valve, when the engine speed is high, the fuel injection valve injects fuel by lifting the valve element by a large lift as compared to when the engine speed is low.

9. The direct injection spark ignition internal combustion engine according to claim 7, wherein the fuel injection valve includes:
an elastic member provided between the valve element of the fuel injection valve and a main body of the fuel injection valve and that urges the valve element in a valve-closing direction; and
a piezoelectric strain actuator provided between the valve element of the fuel injection valve and the main body of the fuel injection valve and that extends to lift the valve element up, and
the lift of the valve element is adjusted by changing extension of the piezoelectric strain actuator by controlling a voltage supplied to the piezoelectric strain actuator.

10. The direct injection spark ignition internal combustion engine according to claim 7, wherein the fuel injection valve includes:
an elastic member provided between the valve element of the fuel injection valve and a main body of the fuel injection valve and that urges the valve element in a valve-closing direction; and
an electromagnetic actuator arranged to face a base portion of the valve element so that an electromagnetic attracting force of the electromagnetic actuator acts in a direction to lift the valve element up, and the lift of the valve element is adjusted by changing an electromagnetic attracting force acting on the valve element by controlling a voltage supplied to the electromagnetic actuator.

11. The direct injection spark ignition internal combustion engine according to claim 1, wherein the fuel injection valve is provided at the intake valve side of the periphery of the upper area of the engine cylinder and injects fuel toward an upper portion of an exhaust valve side of a bore of the engine cylinder.

12. The direct injection spark ignition internal combustion engine according to claim 11, wherein the profile of a cam for the intake valve is formed such that the speed at which the intake valve is opened is higher than the speed at which the intake valve is closed.

13. The direct injection spark ignition internal combustion engine according to claim 1, wherein the time to close the intake valve is set in the range of 90±20° CA (Crank Angle) after the intake stroke bottom dead center.

14. A method for controlling a direct injection spark ignition internal combustion engine including a fuel injection valve that directly injects fuel into an engine cylinder, comprising:
executing an Atkinson cycle operation in which the time to close an intake valve is retarded;
intensifying a tumble flow in the engine cylinder by fuel injected from the fuel injection valve during a time period from an intake stroke bottom dead center to closing of the intake valve; and
controlling the fuel injection to be started after the intake stroke bottom dead center has been passed.

* * * * *